(12) United States Patent
Taniyama et al.

(10) Patent No.: US 12,298,498 B2
(45) Date of Patent: May 13, 2025

(54) OPTICAL DEVICE, SCANNING OPTICAL DEVICE, AND IMAGE FORMING DEVICE

(71) Applicant: Konica Minolta Inc., Tokyo (JP)

(72) Inventors: Akira Taniyama, Hino (JP); Ryo Hasegawa, Hachioji (JP); Takahiro Matsuo, Hachioji (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 18/353,178

(22) Filed: Jul. 17, 2023

(65) Prior Publication Data
US 2024/0027749 A1    Jan. 25, 2024

(30) Foreign Application Priority Data
Jul. 20, 2022    (JP) .................................. 2022-115646

(51) Int. Cl.
G03G 15/04    (2006.01)
G02B 26/08    (2006.01)
G02B 26/12    (2006.01)

(52) U.S. Cl.
CPC ....... G02B 26/124 (2013.01); G02B 26/0816 (2013.01); G03G 15/0409 (2013.01)

(58) Field of Classification Search
CPC .. G03G 15/0409; G02B 26/10; G02B 26/124; G02B 26/0816; H04N 1/0027; H04N 1/00018; H04N 1/2129

USPC ....................................... 399/221; 359/224.1
See application file for complete search history.

(56) References Cited

U.S. PATENT DOCUMENTS 7,684,100 B2 *    3/2010    Amada .............. G02B 27/0031
                                                    359/224.1

FOREIGN PATENT DOCUMENTS

CN    100430773    * 11/2008
JP    2000249954 A    9/2000

* cited by examiner

*Primary Examiner* — Hoan H Tran
(74) *Attorney, Agent, or Firm* — CANTOR COLBURN LLP

(57) ABSTRACT

An optical device includes: an optical element having a first surface and a second surface; a first seat surface member that abuts on the first surface of the optical element; a first pressing member that abuts on the second surface of the optical element at a position facing the first seat surface member via the optical element, and press the optical element against the first seat surface member; an adjustment member that abuts on the second surface of the optical element at a position different from the first pressing member, and displaces the abutment position to adjust a posture of the optical element; and a second pressing member that abuts on the first surface of the optical element at a position facing the adjustment member via the optical element, and applies a pressing force to the abutment position to press the optical element against the adjustment member.

21 Claims, 15 Drawing Sheets

OPTICAL DEVICE, SCANNING OPTICAL DEVICE, AND IMAGE FORMING DEVICE

CROSS REFERENCE TO PRIOR APPLICATIONS

The present invention claims priority under 35 U.S.C. § 119 to Japanese Application No. 2022-115646 filed Jul. 20, 2022, the entire content of which is incorporated herein by reference.

BACKGROUND

Technological Field

The present invention relates to an optical device, a scanning optical device, and an image forming device.

Description of the Related Art

In an electrophotographic image forming device, an electrostatic latent image is formed on an image carrier such as a photosensitive drum by a scanning optical device, and the electrostatic latent image is developed by a developing device to form a toner image. The scanning optical device forms an electrostatic latent image on an image carrier by deflecting a light ray emitted from a light source by an optical polarizer. In this type of scanning optical device, an optical element such as a mirror or a lens is disposed on a path of a light ray.

JP 2000-249954 A describes a scanning optical device that includes a shaft that rotatably supports a mirror, an adjustment screw that abuts on a back surface of the mirror, and a compression coil spring that abuts on the back surface of the mirror and is capable of adjusting a posture (angle) of the mirror by rotating the adjustment screw.

In the scanning optical device described in JP 2000-249954 A, a shaft is provided at the center portion of the mirror in the longitudinal direction, and the mirror is rotatably supported around the shaft. In addition, in this scanning optical device, the adjustment screw is brought into contact with the mirror back surface above the center portion of the mirror in the longitudinal direction, and the compression coil spring is brought into contact with the mirror back surface below the center portion of the mirror in the longitudinal direction. Then, in this scanning optical device, the posture of the mirror is changed by a method in which the mirror rotates around the shaft, that is, a see-saw method by rotationally operating the adjustment screw.

However, in the scanning optical device described in JP 2000-249954 A, since the adjustment screw and the compression coil spring are disposed with the shaft interposed between in the longitudinal direction of the mirror, the dimension from the shaft to the adjustment screw is shortened. For this reason, in the above scanning optical device, there is a problem that sensitivity (hereinafter, it is also referred to as "adjustment sensitivity") when the posture of the mirror is adjusted by rotating the adjustment screw becomes large, and it is difficult to finely adjust the posture of the mirror.

SUMMARY

The present invention has been made to solve the above problems, and an object is to provide an optical device, a scanning optical device, and an image forming device capable of suppressing sensitivity at the time of adjusting a posture of an optical element to be low.

To achieve the abovementioned object, according to an aspect of the present invention, an optical device reflecting one aspect of the present invention comprises: an optical element having a first surface and a second surface; a first seat surface member that abuts on the first surface of the optical element; a first pressing member that abuts on the second surface of the optical element at a position facing the first seat surface member via the optical element, and applies a pressing force to the abutment position to press the optical element against the first seat surface member; an adjustment member that abuts on the second surface of the optical element at a position different from the first pressing member, and displaces the abutment position to adjust a posture of the optical element; and a second pressing member that abuts on the first surface of the optical element at a position facing the adjustment member via the optical element, and applies a pressing force to the abutment position to press the optical element against the adjustment member.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Figure 1:
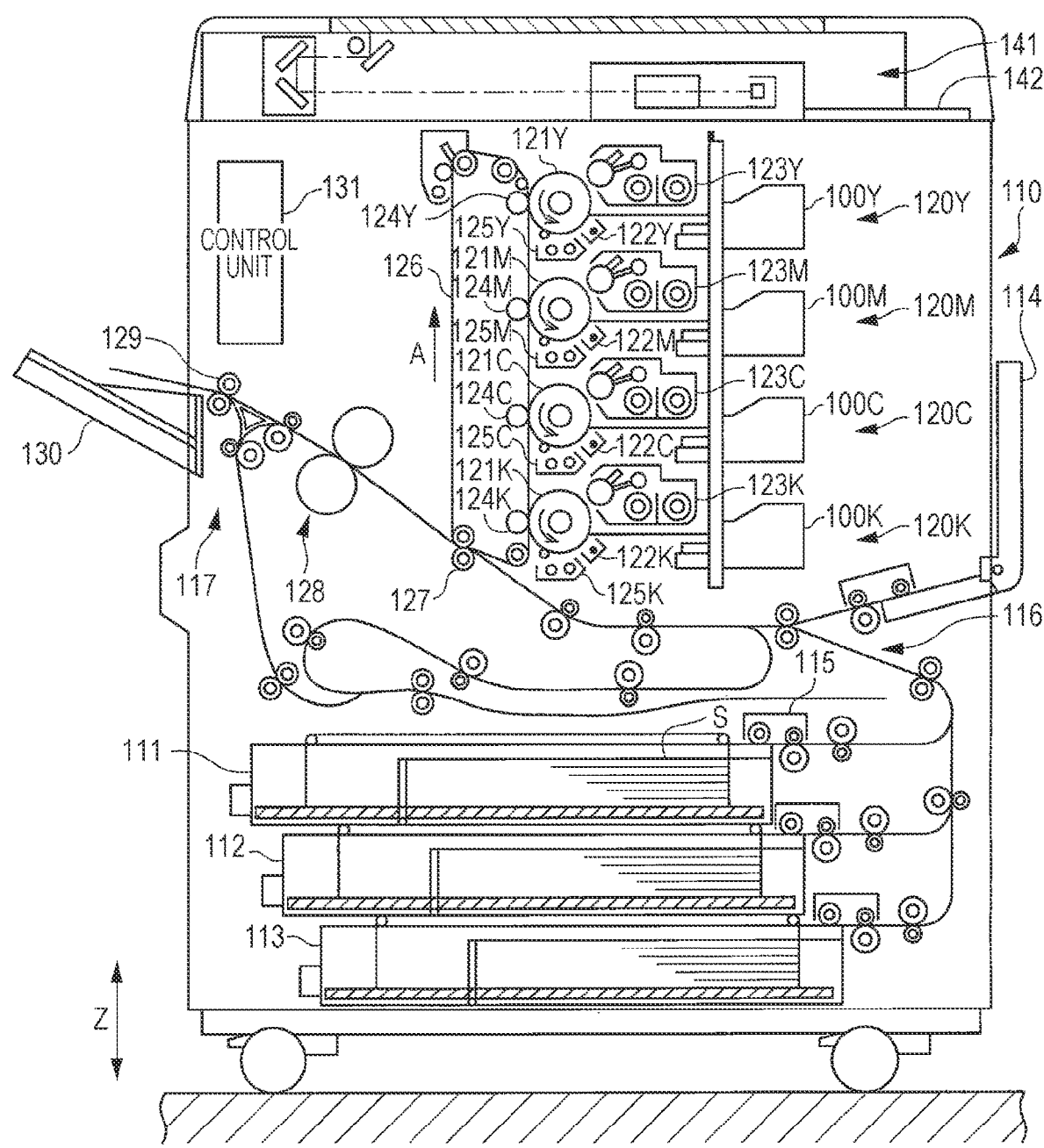
FIG. 1 is a schematic side view illustrating a configuration example of an image forming device according to an embodiment of the present invention.

Hereinafter, one or more embodiments of the present invention will be described with reference to the drawings. However, the scope of the invention is not limited to the disclosed embodiments. In the present specification and the drawings, elements having substantially the same function or configuration are denoted by the same reference numerals, and redundant description is omitted.

FIG. 1 is a schematic side view illustrating a configuration example of an image forming device according to an embodiment of the present invention.

As illustrated in FIG. 1, an image forming device 1 is a so-called tandem color multi-function peripheral (MFP). The image forming device 1 includes an image forming unit 110, an image reading unit 141, and an operation panel 142.

The image reading unit 141 reads a document and generates image data. The operation panel 142 presents information to the user of the image forming device 1 and receives an instruction input from the user. The image forming device 1 forms an image in accordance with an instruction input from a user.

The image forming unit 110 forms an image on a recording medium using image data generated by the image reading unit 141 or image data designated by a user. The image forming unit 110 includes imaging units 120Y, 120M, 120C, and 120K that form toner images of respective colors of yellow (Y), magenta (M), cyan (C), and black (K), and an intermediate transfer belt 126.

The intermediate transfer belt 126 is an endless belt body, and rotates in a direction A. The imaging units 120Y, 120M, 120C, and 120K are arranged in a line in a vertical direction Z along the outer peripheral surface of the intermediate transfer belt 126. The imaging units 120Y, 120M, 120C, and 120K include corresponding photosensitive drums 121Y, 121M, 121C, and 121K, charging devices 122Y, 122M, 122C, and 122K, scanning optical devices 100Y, 100M, 100C, and 100K, developing devices 123Y, 123M, 123C, and 123K, and cleaning devices 125Y, 125M, 125C, and 125K, respectively.

The imaging units 120Y, 120M, 120C, and 120K uniformly charge the outer peripheral surfaces of the photosensitive drums 121Y, 121M, 121C, and 121K by the charging devices 122Y, 122M, 122C, and 122K while rotationally driving the corresponding photosensitive drums 121Y, 121M, 121C, and 121K, respectively. Each of the photosensitive drums 121Y, 121M, 121C, and 121K corresponds to an image carrier.

The scanning optical devices 100Y, 100M, 100C, and 100K emit light beams to expose and scan the outer peripheral surfaces of the photosensitive drums 121Y, 121M, 121C, and 121K, respectively, forming electrostatic latent images. The light amounts of the light beams emitted from the scanning optical devices 100Y, 100M, 100C, and 100K are modulated according to the image data of respective colors of YMCK.

The developing devices 123Y, 123M, 123C, and 123K develop the electrostatic latent images into toner images by supplying toners of the respective colors of YMCK to the outer peripheral surfaces of the corresponding photosensitive drums 121Y, 121M, 121C, and 121K.

Primary transfer rollers 124Y, 124M, 124C, and 124K are respectively pressed against the photosensitive drums 121Y, 121M, 121C, and 121K with the intermediate transfer belt 126 interposed between. Primary transfer voltage is applied to each of the primary transfer rollers 124Y, 124M, 124C, and 124K. The primary transfer rollers 124Y, 124M, 124C, and 124K electrostatically transfer the toner images of the respective colors of YMCK carried on the outer peripheral surfaces of the corresponding photosensitive drums 121Y, 121M, 121C, and 121K onto the outer peripheral surface of the intermediate transfer belt 126 by the above primary transfer voltage (primary transfer).

In the case of forming a color toner image, primary transfer is performed with timing in a manner that the toner images of the respective colors of YMCK overlap each other on the outer peripheral surface of the intermediate transfer belt 126. The intermediate transfer belt 126 conveys the toner image to the secondary transfer position by rotationally traveling in the direction A in a state of carrying the toner image.

A recording medium S is accommodated in each of a sheet feeding trays 111, 112, and 113. The recording medium S is a medium used for image formation, and is, for example, a sheet-like medium such as a sheet, a resin film, or a fabric. A manual feed tray 114 is an openable/closable tray. The recording medium S is placed on the manual feed tray 114 in a state where the manual feed tray 114 is opened.

A sheet feeding unit 115 feeds the recording medium S from the sheet feeding trays 111, 112, and 113 to a conveyance path 116. The recording medium S fed to the conveyance path 116 and the recording medium S fed from the manual feed tray 114 are conveyed to the secondary transfer position.

At the secondary transfer position, a secondary transfer roller 127 is pressed against the outer peripheral surface of the intermediate transfer belt 126. Secondary transfer voltage is applied to the secondary transfer roller 127. When the recording medium S is inserted between the intermediate transfer belt 126 and the secondary transfer roller 127, the toner image is electrostatically transferred from the outer peripheral surface of the intermediate transfer belt 126 onto the image forming surface of the recording medium S (secondary transfer).

A fixing device 128 presses the pressure roller against the high-temperature fixing roller to form a fixing nip. The toner image transferred to the recording medium S is fixed to the recording medium S by passing through the fixing nip. Note that, as a configuration of the fixing device 128, a fixing belt may be used instead of the fixing roller, or a pressure pad may be used instead of the pressure roller.

A sheet ejecting roller 129 ejects the recording medium S on which the image formation has been completed onto a sheet ejecting tray 130. In a case where images are formed on both sides of the recording medium S, in order to form an image on the rear surface of the recording medium S, the conveyance direction of the recording medium S is reversed, and the recording medium S is conveyed to a double-sided reverse path 117. The recording medium S conveyed to the double-sided reverse path 117 is again conveyed to the secondary transfer position, an image is formed on the rear surface, and then the recording medium S is ejected onto the sheet ejecting tray 130.

A control unit 131 controls the operation of the image forming device 1 while monitoring the state of the image forming device 1. The control unit 131 may cause the image forming device 1 to form an image by receiving an image forming job from another device such as a personal computer (PC) via a communication network such as a local area network (LAN) or the Internet. In this case, an image may be formed using image data received from another device.

Next, configurations of the scanning optical devices 100Y, 100M, 100C, and 100K will be described. Note that each of the scanning optical devices 100Y, 100M, 100C, and 100K has a common configuration. For this reason, in the following description, the letters Y, M, C, and K representing the colors of the toner and the image are omitted unless otherwise necessary.

Figure 2:
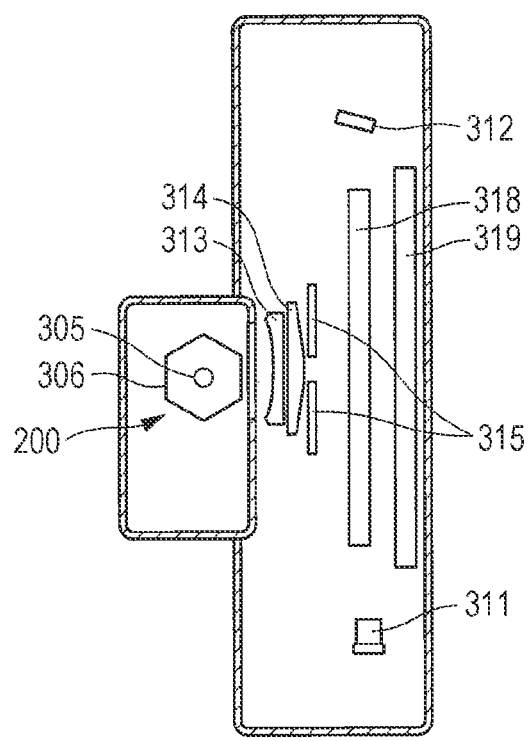
FIG. 2 is a transverse cross-sectional view illustrating a configuration of a scanning optical device.
Figure 3:
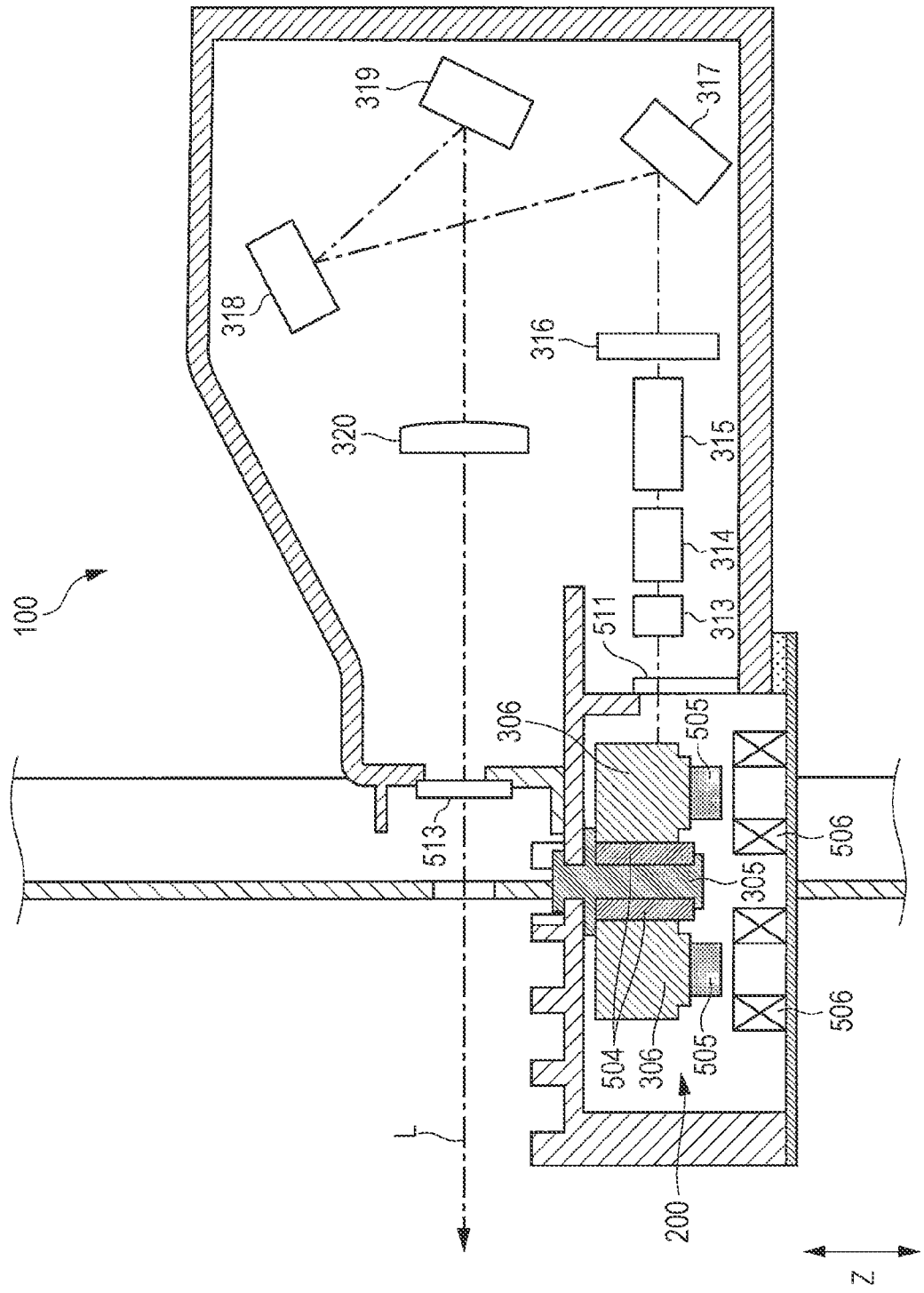
FIG. 3 is a longitudinal cross-sectional view illustrating a configuration of the scanning optical device.

FIG. 2 is a transverse cross-sectional view illustrating a configuration of the scanning optical device, and FIG. 3 is a longitudinal cross-sectional view illustrating a configuration of the scanning optical device.

As illustrated in FIG. 2 and FIG. 3, the scanning optical device 100 includes a semiconductor laser 311, an optical deflector 200, mirrors 312, 317, 318, and 319, and fθ lenses 313, 314, 315, 316, and 320. The semiconductor laser 311 is provided as an example of a light source.

The fθ lenses 313, 314, and 315 are cylindrical lenses. The fθ lenses 316 and 320 are toroidal lenses. Note that the scanning optical device according to the present disclosure is not limited to the configuration illustrated in FIG. 2 and FIG. 3 and may have a configuration in which another lens or mirror is combined. In addition, the light source that emits a light beam L as a light ray is not limited to the semiconductor laser 311, and the light beam L may be emitted using a light source other than the semiconductor laser 311. However, in order to obtain high image quality, it is desirable to use a light source capable of modulating the light amount of the light beam L at a high speed.

The optical deflector 200 includes a polygon mirror 306. The polygon mirror 306 is a rotating polygon mirror. The polygon mirror 306 is attached to a rotation shaft 305 via a bearing 504 and rotates around the rotation shaft 305. A magnet 505 is attached to the lower end of the polygon mirror 306. In addition, a coil 506 is disposed at a position facing the magnet 505. The magnet 505 and the coil 506 constitute a polygon motor. The polygon motor is a motor for rotating the polygon mirror 306.

In the scanning optical device 100 having the above configuration, the light beam L emitted from a semiconductor laser 301 is reflected by a mirror 312 (FIG. 2), and then, is incident on the reflection surface of the polygon mirror 306 through a flat glass 511. Next, the light beam L is deflected in the main scanning direction by the rotation of the polygon mirror 306. At this time, as illustrated in FIG. 3, the light beam L deflected by the polygon mirror 306 is incident on the outer peripheral surface of the photosensitive drum 121 via the flat glass 511, the fθ lenses 313, 314, 315, and 316, the mirrors 317, 318, and 319, the fθ lens 320, and a flat glass 513 in order. As a result, an electrostatic latent image is formed on the outer peripheral surface of the photosensitive drum 121. At this time, if the posture of the mirror 318, which is one of the optical elements of the scanning optical device 100, is shifted, the position of the light beam L incident on the photosensitive drum 121 is shifted. For this reason, scanning optical device 100 includes a mechanism (hereinafter, referred to as an "adjustment mechanism") for adjusting the posture of mirror 318. In the present specification, the configuration of the adjustment mechanism will be described in a plurality of embodiments.

First Embodiment

Figure 4:
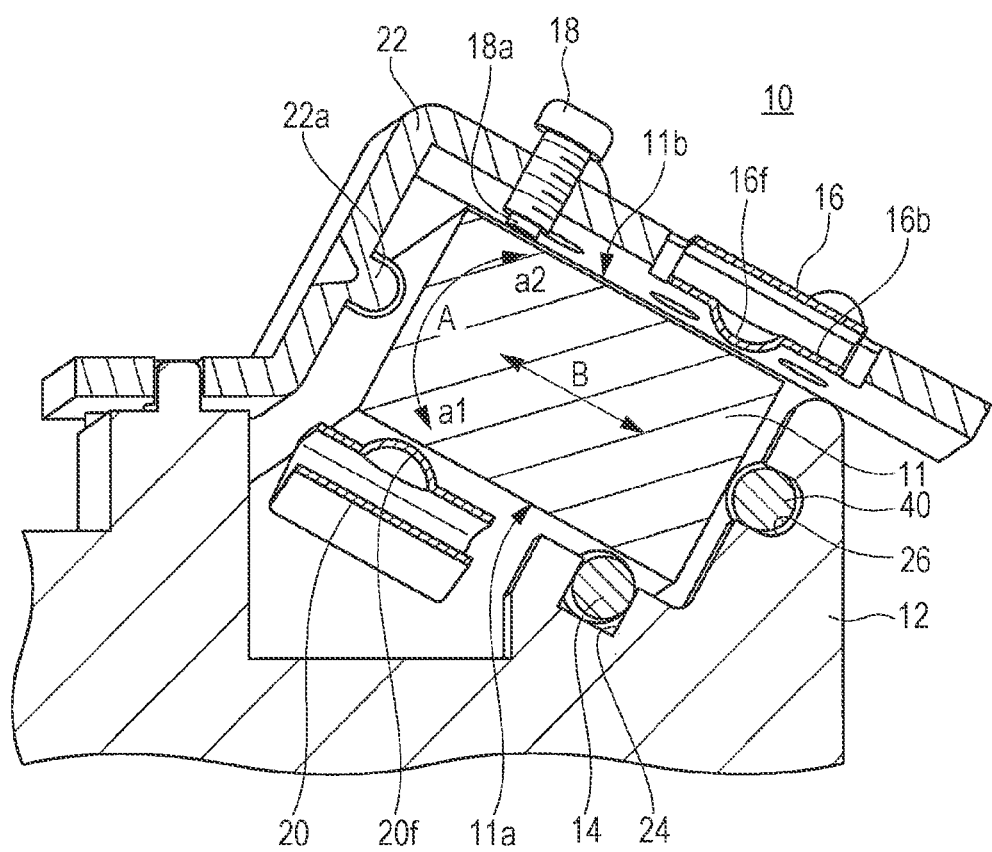
FIG. 4 is a cross-sectional view illustrating a configuration of an adjustment mechanism according to a first embodiment.
Figure 5:
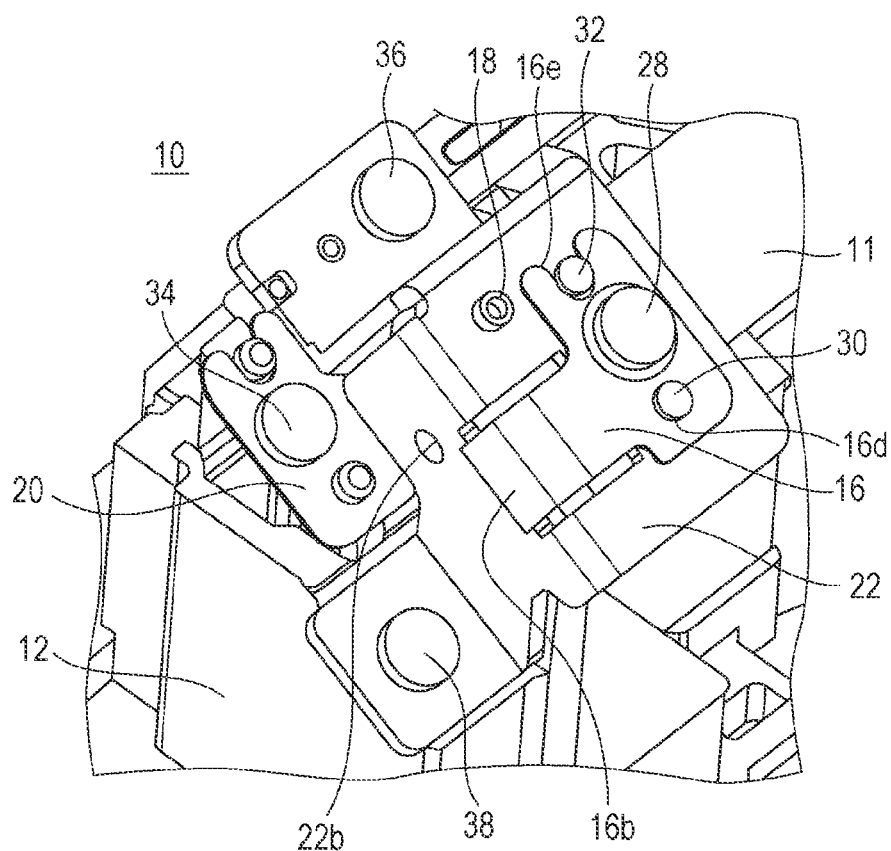
FIG. 5 is a perspective view illustrating a configuration of the adjustment mechanism according to the first embodiment.
Figure 6:
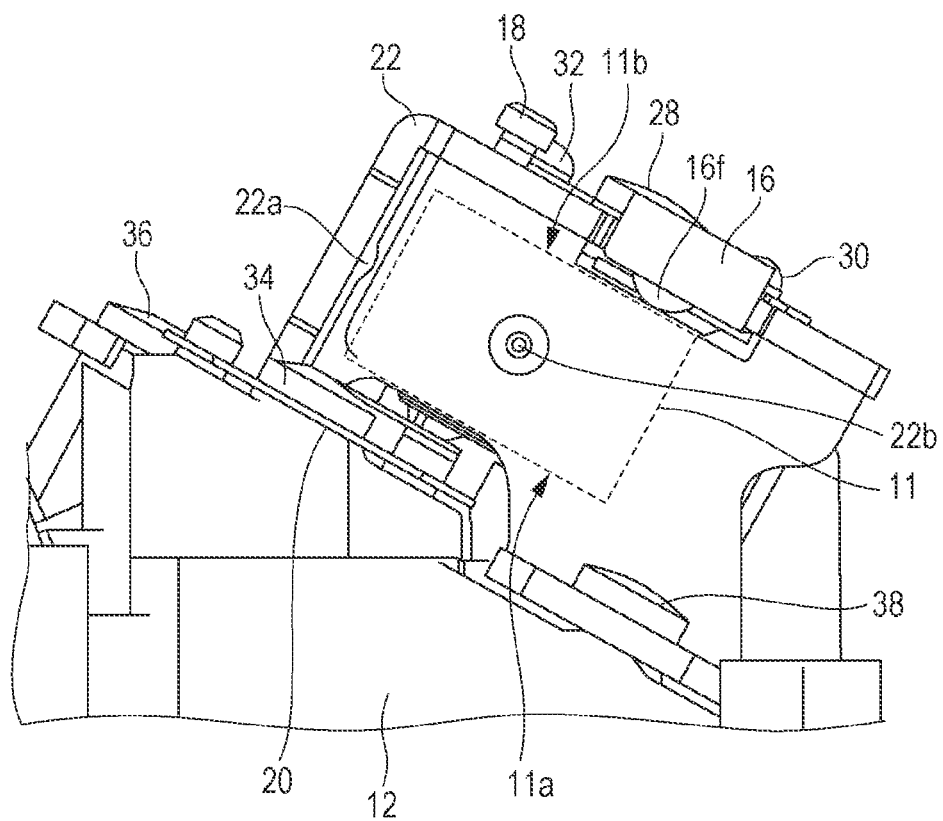
FIG. 6 is a side view illustrating a configuration of the adjustment mechanism according to the first embodiment.

FIG. 4 is a cross-sectional view illustrating a configuration of an adjustment mechanism according to a first embodiment. FIG. 5 is a perspective view illustrating a configuration of the adjustment mechanism according to the first embodiment. FIG. 6 is a side view illustrating a configuration of the adjustment mechanism according to the first embodiment.

In FIG. 4 to FIG. 6, an adjustment mechanism 10 is a mechanism for adjusting the posture of an optical element 11. The optical element 11 corresponds to the mirror 318 described above. When the angle or orientation of the optical element 11 changes, the posture of the optical element 11 changes accordingly. For this reason, the posture of the optical element 11 can be rephrased as the angle of the optical element 11 or the orientation of the optical element 11. In addition, the angle of the optical element 11 may mean an angle in one direction or an angle in another direction.

The optical element 11 is a rectangular parallelepiped formed in an elongated shape. The optical element 11 has a first surface 11a and a second surface 11b disposed in a front and back relationship. The first surface 11a and the second surface 11b are disposed to face opposite directions to each other. In a case where the optical element 11 is the mirror 318, the first surface 11a corresponds to the reflection surface of the mirror 318, and the second surface 11b corresponds to the rear surface of the mirror 318. The reflection surface of mirror 318 is a surface for mirror 318 to function as an optical element, that is, an optical surface. The mirror 318 is, for example, a mirror that forms a reflection surface by depositing metal, silicon dioxide, or the like on one surface of a float plate glass and reflects light rays by the reflection surface.

Note that FIG. 4 illustrates a state in which the adjustment mechanism 10 is sectioned at one end side in the longitudinal direction of the optical element 11. The optical element to be subjected to posture adjustment may be an optical element other than a mirror (for example, a lens or the like). In addition, the shape of the optical element is not limited to an elongated shape or a rectangular parallelepiped.

The adjustment mechanism 10 includes a housing 12, a steel ball 14, a spring member 16, an adjustment screw 18, a spring member 20, and a bracket 22. The steel ball 14 corresponds to a first seat surface member, and the spring member 16 corresponds to a first pressing member. In addition, the adjustment screw 18 corresponds to an adjustment member, and the spring member 20 corresponds to a second pressing member.

The housing 12 is, for example, an aluminum housing molded using a die casting mold. The housing 12 is also a casing that accommodates components necessary for the scanning optical device 100. The housing 12 is finished to have high dimensional accuracy on the order of microns by cutting after molding. Concave portions 24 and 26 are formed in the housing 12.

The steel ball 14 is a member that supports the optical element 11 in order to adjust the posture of the optical element 11 by the rotation of the adjustment screw 18. The steel ball 14 has a high dimensional accuracy on the order of several microns. The steel ball 14 is disposed in the concave portion 24 of the housing 12. The steel ball 14 abuts on the first surface 11a of the optical element 11. The contact state at the abutment position between the steel ball 14 and the optical element 11 is point contact because the steel ball 14 has a spherical shape. The posture of the optical element 11 changes as the optical element 11 rotates in the direction A around the abutment position with the steel ball 14 as a fulcrum.

The spring member 16 abuts on the second surface 11b of the optical element 11 at a position facing the steel ball 14 via the optical element 11. The spring member 16 is a member that applies a pressing force to an abutment position with the second surface 11b of the optical element 11 to urge the optical element 11 to be pressed against the steel ball 14.

Figure 7:
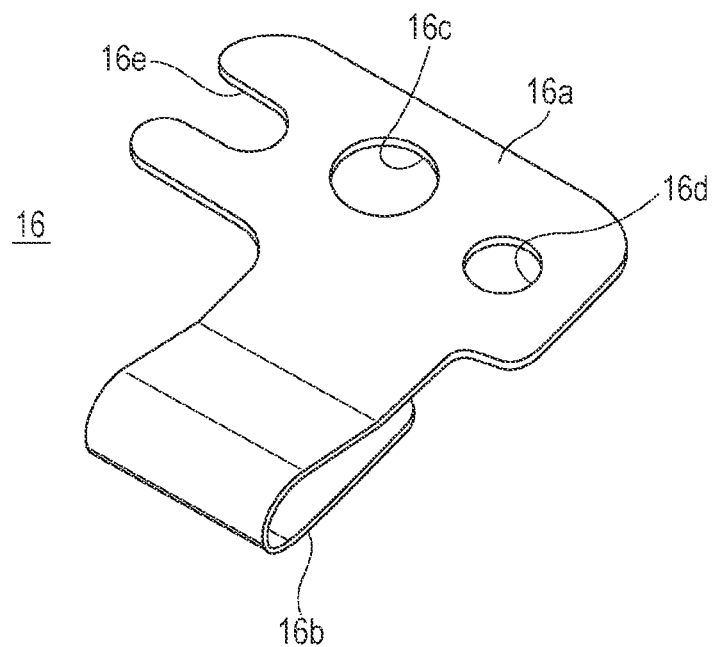
FIG. 7 is a perspective view illustrating a configuration of a spring member.
Figure 8:
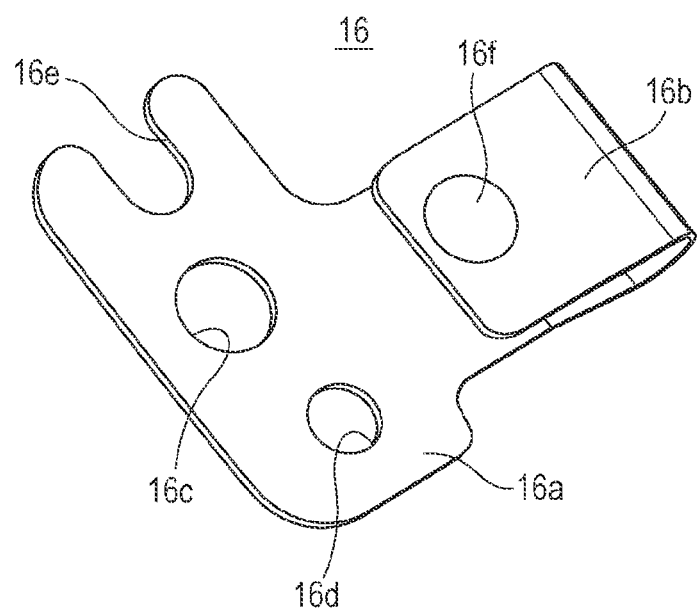
FIG. 8 is a perspective view of the spring member illustrated in FIG. 7 as viewed from an opposite side.

FIG. 7 is a perspective view illustrating a configuration of a spring member. FIG. 8 is a perspective view of the spring member illustrated in FIG. 7 as viewed from an opposite side.

As illustrated in FIG. 7 and FIG. 8, the spring member 16 integrally includes an attachment portion 16a and a folded portion 16b. The spring member 16 is formed of, for example, a leaf spring made of stainless steel or the like. The attachment portion 16a is a portion for attaching the spring member 16 to an object. The spring member 16 is attached to the bracket 22. For this reason, an object to which the spring member 16 is attached is the bracket 22.

An attachment hole 16c, a positioning hole 16d, and a cutout 16e for positioning are formed in the attachment portion 16a. The attachment hole 16c is a through hole for attaching the spring member 16 to the bracket 22 with a screw 28 (FIG. 5). A screw hole (not illustrated) is formed in the bracket 22, and the screw 28 engages with the screw hole. Then, the spring member 16 is fixed to the bracket 22 by the fastening force of the screw 28. As illustrated in FIG. 5, the positioning hole 16d is a hole for positioning the spring member 16 with respect to the bracket 22 by being fitted to a convex portion 30 formed in the bracket 22. The cutout 16e is a portion for positioning the spring member 16 with respect to the bracket 22 by being fitted to a convex portion 32 provided on the bracket 22.

The folded portion 16b is a portion for imparting an appropriate spring property to the spring member 16. The folded portion 16b is formed in a substantially U shape. A contact portion 16f is formed at the folded portion 16b. The contact portion 16f is formed in a convex and spherical shape. The contact portion 16f is a portion pressed against the second surface 11b of the optical element 11 by the spring property of the spring member 16 by the folded portion 16b. The contact state at the abutment position between the spring member 16 and the optical element 11 is point contact because the contact portion 16f has a spherical shape.

Figure 9:
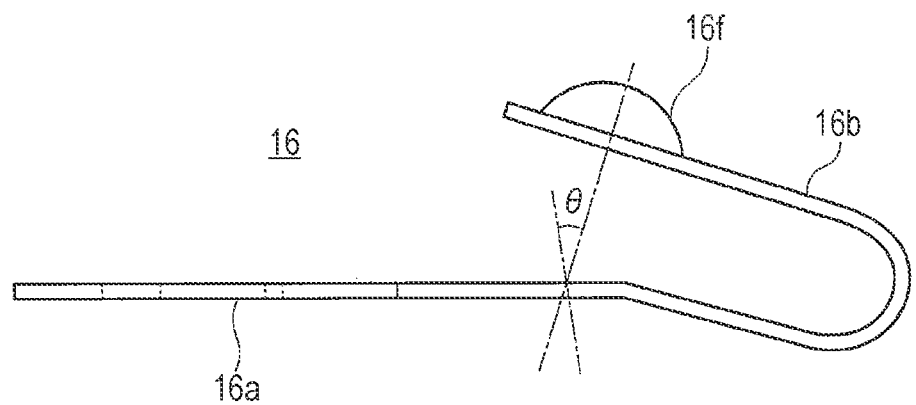
FIG. 9 is a view illustrating a shape of a spring member before deformation.
Figure 10:
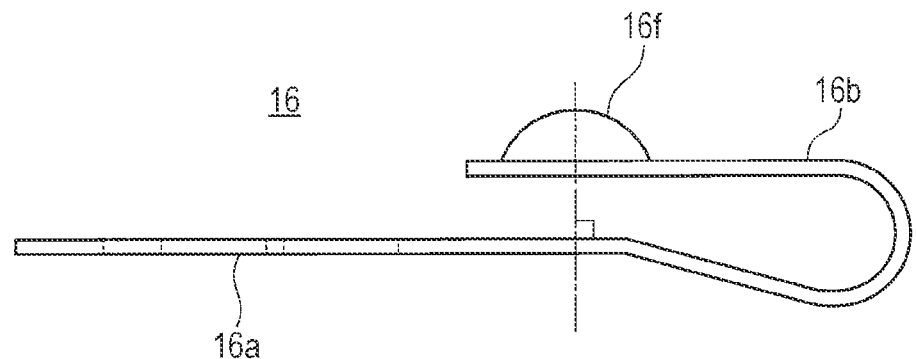
FIG. 10 is a view illustrating a shape of a spring member after deformation.

FIG. 9 is a view illustrating a shape of a spring member before deformation, and FIG. 10 is a view illustrating a shape of a spring member after deformation. Before deformation means before the spring member is brought into contact with the optical element, and after deformation means after the spring member is brought into contact with the optical element.

As illustrated in FIG. 9, in the spring member 16 before deformation, the folded portion 16b is opened in a U shape, and the contact portion 16f is disposed in an orientation inclined at an angle θ with respect to the attachment portion 16a. On the other hand, as illustrated in FIG. the spring member 16 after deformation is pushed in a direction in which the folded portion 16b is closed, and the contact portion 16f is disposed in an orientation substantially perpendicular to the attachment portion 16a.

The adjustment screw 18 is a member that abuts on the second surface 11b of the optical element 11 at a position different from the spring member 16 and displaces the abutment position to adjust the posture of the optical element 11. The adjustment screw 18 engages with a screw hole (not illustrated) formed in the bracket 22 corresponding to the attachment position of the adjustment screw 18. A tip portion 18a of the adjustment screw 18 abuts on the second surface 11b of the optical element 11. The tip portion 18a of the adjustment screw 18 is formed in a spherical shape. For this reason, the contact state at the abutment position between the adjustment screw 18 and the optical element 11 is point contact.

The steel ball 14 abuts on the first surface 11a of the optical element 11 on one end side in a lateral direction B of the optical element 11, and the adjustment screw 18 abuts on the second surface 11b of the optical element 11 on the other end side in the lateral direction B of the optical element 11. For this reason, the abutment position between the optical element 11 and the steel ball 14 and the abutment position between the optical element 11 and the adjustment screw 18 are shifted in the lateral direction B of the optical element 11. The shift amount (shift dimension) is preferably larger than ½ of the lateral dimension of the optical element 11.

The spring member 20 is a member that abuts on the first surface 11a of the optical element 11 at a position facing the adjustment screw 18 via the optical element 11 and applies a pressing force to the abutment position to urge the optical element 11 to be pressed against the adjustment screw 18. The spring member 20 has the same shape and the same dimension as those of the spring member 16 (FIG. 7 and FIG. 8) described above. That is, the spring member 16 and the spring member 20 are the same member. As a result, the number of types of components can be reduced to achieve cost reduction.

As illustrated in FIG. 5, the spring member 20 is attached to the housing 12 by a screw 34. For this reason, an object to which the spring member 20 is attached is the housing 12. The spring member 20 is positioned in the housing 12 with a structure similar to that of the spring member 16. As illustrated in FIG. 4, the spring member 20 is attached in an orientation (opposite orientation) different from the spring member 16. The spring member 20 has a contact portion 20f (FIG. 4) similar to the spring member 16 described above. The contact portion 20f is a portion that abuts on the first surface 11a of the optical element 11. The contact portion 20f is pressed against the first surface 11a of the optical element 11 by the spring property of the spring member 20. The contact state at the abutment position between the spring member 20 and the optical element 11 is point contact because the contact portion 20f has a spherical shape.

The bracket 22 is a member that holds the spring member 16 and the adjustment screw 18. The bracket 22 is made of, for example, a sheet metal. As illustrated in FIG. 5, the bracket 22 is attached to the housing 12 by a plurality of screws 36 and 38. The bracket 22 is positioned in the housing 12 with a structure similar to that of the spring member 16. A boss 22a is integrally formed with the bracket 22. The boss 22a is formed by drawing, for example. The boss 22a is disposed to protrude toward the side of the optical element 11. The boss 22a is formed in a spherical shape.

On the other hand, a steel ball 40 is disposed in the concave portion 26 of the housing 12. The steel ball 40 is disposed on the opposite side of the boss 22a with the optical element 11 interposed between. The steel ball 40 is disposed in an orientation facing the boss 22a via the optical element 11 in the lateral direction B of the optical element 11. The boss 22a and the steel ball 40 constitute a fall prevention part that prevents the optical element 11 from falling off from the steel ball 14 or the adjustment screw 18 by regulating the displacement of the optical element 11 in the in-plane direction. The in-plane direction of the optical element 11 is a direction parallel to the first surface 11a and the second surface 11b of the optical element 11. Both the boss 22a and the steel ball 40 constituting the fall prevention part have a shape (spherical shape in this example) that can be brought into point contact with the optical element 11.

The fall prevention part is preferably disposed in a non-pressed state with the optical element 11. The non-pressed state refers to a state in which the fall prevention part lightly comes into contact with the optical element 11 or a state in which the fall prevention part is separated from the optical element 11. Specifically, the boss 22a and the steel ball 40, which are components of the fall prevention part, are disposed in a state of lightly coming into contact with the optical element 11 or in a state of being separated from the optical element 11. However, if the components of the fall prevention part are too far from the optical element 11, there is a possibility that the displacement of the optical element 11 in the in-plane direction cannot be sufficiently regulated. For this reason, it is preferable that the components of the fall prevention part are disposed in a state of being separated from the optical element 11 with a slight gap (for example, a gap of about 0.5 mm) from the optical element 11.

By disposing the fall prevention part (in this example, the boss 22a and the steel ball 40) in a non-pressed state with respect to the optical element 11 in this manner, a frictional force acting between the fall prevention part and the optical element 11 can be suppressed. For this reason, in a case where the posture of the optical element 11 is adjusted by rotating the adjustment screw 18, it is possible to prevent the tip portion 18a of the adjustment screw 18 from separating from the second surface 11b of the optical element 11 due to the frictional force acting between the fall prevention part and the optical element 11. Therefore, the followability of the movement of the optical element 11 when the adjustment screw 18 is rotationally operated can be improved.

Figure 11:
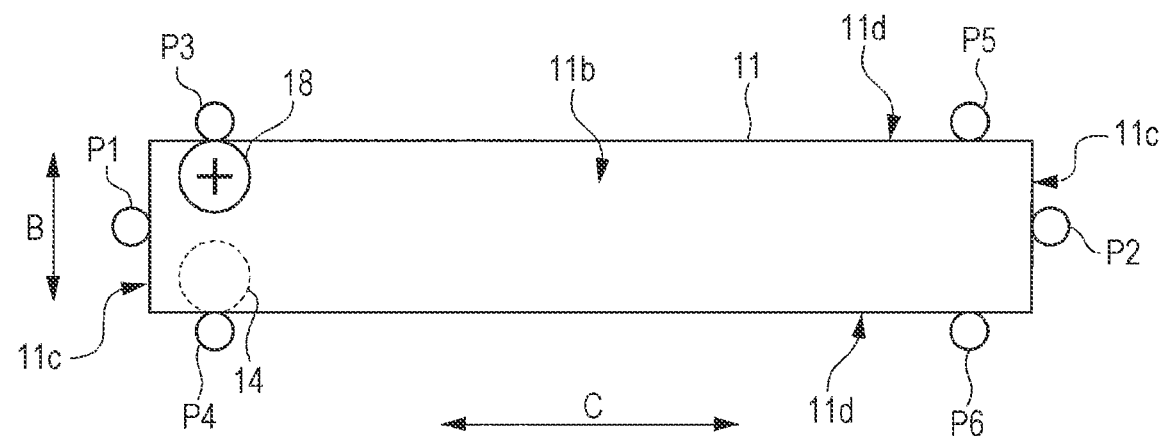
FIG. 11 is a view explaining arrangement of a fall prevention part.

As illustrated in FIG. 11, the components of the fall prevention part are disposed at positions P1 and P2 corresponding to both end surfaces 11c and 11c in a longitudinal direction C of the optical element 11 and positions P3, P4, P5, and P6 corresponding to both side surfaces 11d and 11d in the lateral direction B of the optical element 11, respectively. The boss 22a and the steel ball 40 described above are disposed at the positions P3 and P4 corresponding to the both side surfaces 11d and 11d of the optical element 11 on one end side in the longitudinal direction C of the optical element 11. In addition, for example, steel balls are disposed at the positions P1 and P2 corresponding to the both end surfaces 11c and 11c in the longitudinal direction C of the optical element 11. In addition, at the positions P5 and P6 corresponding to the both side surfaces 11d and 11d of the optical element 11, for example, bosses 22a and steel balls 40 similar to those described above are disposed. In addition, steel balls may be disposed at all the six positions described above. In addition, the boss 22b (FIGS. 5 and 6) integrally formed with bracket 22 may be disposed at at least one of the positions P1 and P2 corresponding to the both end surfaces 11c and 11c in longitudinal direction C of the optical element 11. Similarly, to the boss 22a, the boss 22b is formed into a spherical shape protruding toward the side of the optical element 11.

Figure 12:
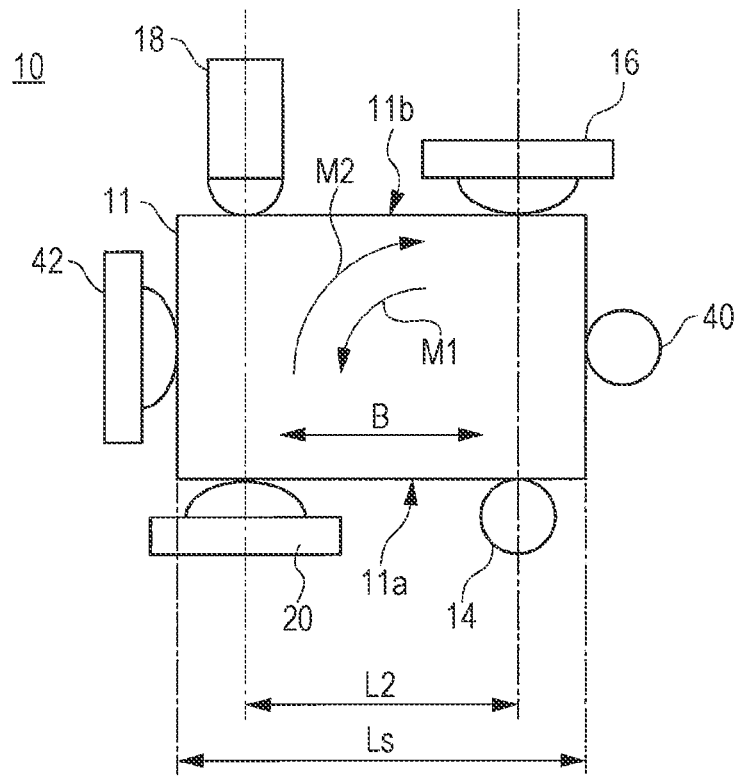
FIG. 12 is a view illustrating a modification of the fall prevention part.

In addition, in place of the boss 22a illustrated in FIG. 4 and FIG. 5, for example, a spring member 42 may be disposed as illustrated in FIG. 12. The spring member 42 preferably has the same shape and the same dimension as those of the spring member 16 (FIG. 7 and FIG. 8) described above. The spring member 42 abuts on the optical element 11 at a position facing the steel ball 40 via the optical element 11 in the lateral direction B of the optical element 11 and applies a pressing force to this abutment position to urge the optical element 11 to press the steel ball 40. As a result, the displacement of the optical element 11 in the lateral direction B of the optical element 11 can be suppressed by the pressing force of the spring member 42. The pressing force of the spring member 42 is preferably set to such a magnitude that the abutment state between the tip portion 18a of the adjustment screw 18 and the second surface 11b of the optical element 11 can be maintained by the pressing force of the spring member 20 when the adjustment screw 18 is rotationally operated.

Figure 13:
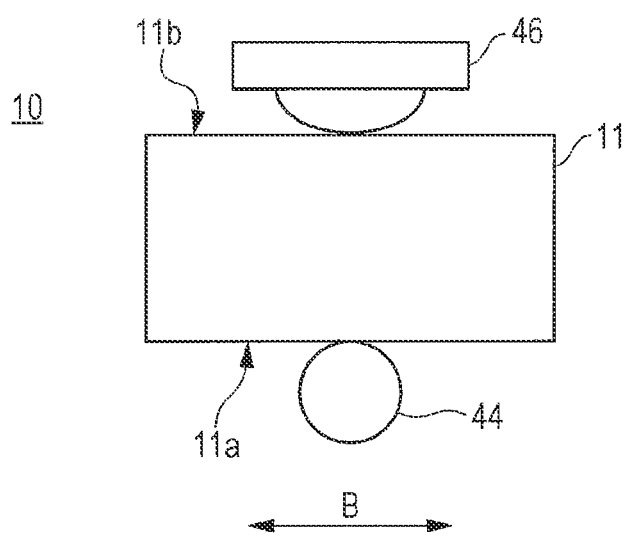
FIG. 13 is a view explaining a mechanism that supports another end side in a longitudinal direction of an optical element.
Figure 14:
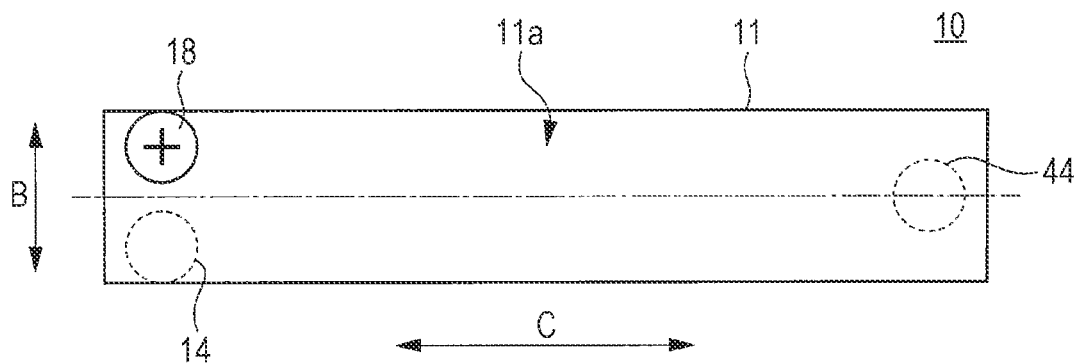
FIG. 14 is a view illustrating arrangement of members in the longitudinal direction of the optical element.

FIG. 13 is a view explaining a mechanism that supports another end side in a longitudinal direction of an optical element. The other end side in the longitudinal direction of the optical element is the side opposite to the side where the adjustment screw 18 and the steel ball 14 are disposed in FIG. 14 (right end side in FIG. 14). In FIG. 14, the spring member is not illustrated.

As illustrated in FIG. 13 and FIG. 14, a steel ball 44 and a spring member 46 are disposed on the other end side in the longitudinal direction C of the optical element 11. The steel ball 44 corresponds to a second seat surface member, and the spring member 46 corresponds to a third pressing member. The steel ball 44 abuts on the first surface 11a of the optical element 11. The spring member 46 abuts on the second surface 11b of the optical element 11 at a position facing the spring member 46 via the optical element 11. The spring member 46 is a member that applies a pressing force to an abutment position with the second surface 11b of the optical element 11 to urge the optical element 11 to be pressed against the steel ball 44. The spring member 46 preferably has the same shape and the same dimension as those of the spring member 16 (FIG. 7 and FIG. 8) described above.

Figure 15:
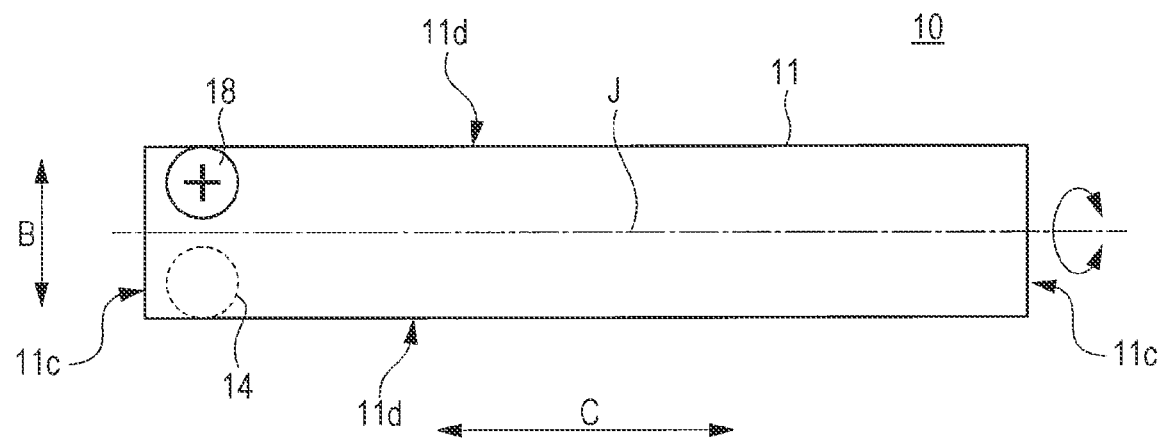
FIG. 15 is a view explaining movement of the optical element when an adjustment screw is rotationally scanned.

The steel ball 44 and the spring member 46 are disposed at the center portion of the optical element 11 in the lateral direction B of the optical element 11. As a result, on the other end side in the longitudinal direction C of the optical element 11, the center portion in the lateral direction B of the optical element 11 is supported by the steel ball 44 in a point contact state. For this reason, in a case where the adjustment screw 18 is rotationally operated, the optical element 11 can be smoothly rotated about a center axis J of the optical element 11 as illustrated in FIG. 15. The center axis J of the optical element 11 is an axis that passes through the center of the both end surfaces 11c of the optical element 11 and is parallel to the longitudinal direction C of the optical element 11.

In the adjustment mechanism 10 having the above configuration, the posture of the optical element 11 can be adjusted by rotationally operating the adjustment screw 18. Details will be described below.

For example, when the adjustment screw 18 is rotated clockwise, the adjustment screw 18 advances, and when the adjustment screw 18 is rotated counterclockwise, the adjustment screw 18 retreats. The amount of advancement or retreat of the adjustment screw 18 depends on the rotation amount of the adjustment screw 18. In addition, when the adjustment screw 18 is rotated clockwise, the optical element 11 is rotated in a direction a1 of FIG. 4 by the amount of advancement of the adjustment screw 18. In addition, when the adjustment screw 18 is rotated counterclockwise, the optical element 11 is rotated in a direction a2 of FIG. 4 by the amount of retreat of the adjustment screw 18. In this manner, the optical element 11 rotates in the direction a1 and the direction a2 according to the rotation direction and the rotation amount of the adjustment screw 18. In addition, the posture (angle) of the optical element 11 changes by the rotation of the optical element 11 in the direction a1 or the direction a2. Therefore, the posture of the optical element 11 can be adjusted by rotationally operating the adjustment screw 18. In addition, in a case where the optical element 11, the posture of which is to be adjusted, is the mirror 318, the angle of the mirror 318 can be adjusted by the rotation of the adjustment screw 18.

Figure 16:
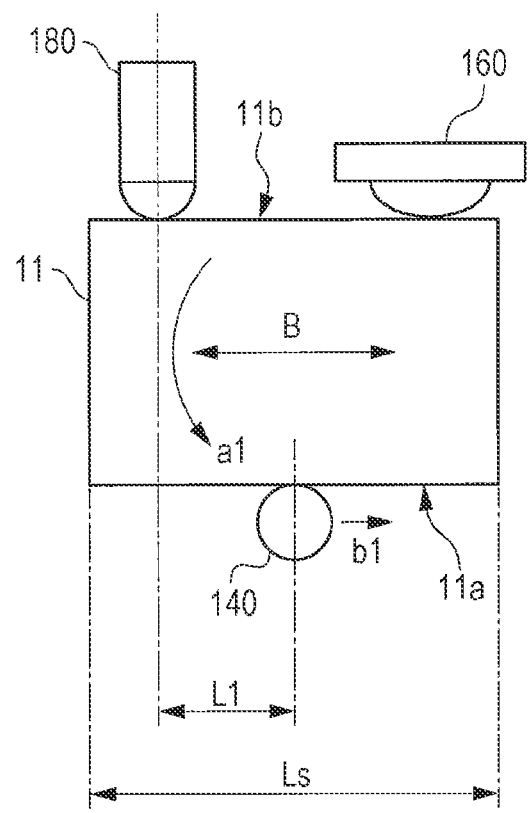
FIG. 16 is a schematic view illustrating a configuration of an adjustment mechanism according to a comparative embodiment.

FIG. 16 is a schematic view illustrating a configuration of an adjustment mechanism according to a comparative embodiment.

The adjustment mechanism illustrated in FIG. 16 includes a steel ball 140 that abuts on the first surface 11a of the optical element 11, and a spring member 160 and an adjustment screw 180 that abut on the second surface 11b of the optical element 11. The steel ball 140, the spring member 160, and the adjustment screw 180 are members that support the optical element 11 on one end side in the longitudinal direction of the optical element 11. The steel ball 140 is disposed at the center portion of the optical element 11 in the lateral direction B. The spring member 160 is disposed on one end side in the lateral direction B of optical element 11, and the adjustment screw 180 is disposed on the other end side in the lateral direction B of the optical element 11.

In the adjustment mechanism having the above configuration, the pressing force of the spring member 160 is applied to the abutment position between the optical element 11 and the adjustment screw 180 by this principle. In addition, when the adjustment screw 180 is rotated, the optical element 11 rotates according to the rotation direction and the rotation amount of the adjustment screw 180 about the abutment position between the optical element 11 and the steel ball 140 as a fulcrum. Therefore, the posture of the optical element 11 can be adjusted by rotationally operating the adjustment screw 180.

However, in the adjustment mechanism according to the comparative embodiment, the steel ball 140 is disposed at the center portion in the lateral direction B of the optical element 11. For this reason, in the lateral direction B of the optical element 11, a dimension L1 that can be secured between the steel ball 140 and the adjustment screw 180 is shorter than ½ of a lateral dimension Ls of the optical element 11. Therefore, in the adjustment mechanism according to the comparative embodiment, the sensitivity increases when the posture of the optical element 11 is adjusted by rotating the adjustment screw 180, and it becomes difficult to make the posture of the optical element 11 fine. In addition, when the steel ball 140 is disposed close to a direction b1 in order to lower the adjustment sensitivity, a counterclockwise moment (direction a1) acts on the optical element 11 due to the influence of gravity. For this reason, the second surface 11b of the optical element 11 is separated from the distal end portion of the adjustment screw 180, and the followability of the movement of the optical element 11 when the adjustment screw 180 is rotationally operated may be deteriorated.

On the other hand, in the adjustment mechanism 10 according to the present embodiment, one end side in the longitudinal direction C of the optical element 11 is supported by the steel ball 14, the spring member 16, the adjustment screw 18, and the spring member 20 as illustrated in FIG. 12. For this reason, in the lateral direction B of the optical element 11, a dimension L2 that can be secured between the steel ball 14 and the adjustment screw 18 is longer than the dimension L1 (FIG. 16) that can be secured in the above comparative embodiment. Therefore, according to the present embodiment, the sensitivity decreases when the posture of the optical element 11 is adjusted by rotating the adjustment screw 18, and the posture of the optical element 11 can be easily finely adjusted. In addition, such an effect of reducing the sensitivity becomes remarkable in a case where the abutment position between the optical element 11 and the steel ball 14 and the abutment position between the optical element 11 and the adjustment screw 18 are disposed to be shifted in the lateral direction B of the optical element 11.

In addition, in the present embodiment, as illustrated in FIG. 12, the pressing force of the spring member 20 is set in a manner that a relationship of M1<M2 holds, where M1 is a moment acting on the optical element 11 by gravity around the abutment position between the optical element 11 and the steel ball 14, and M2 is a moment acting on the optical element 11 by the pressing force of the spring member 20 around the abutment position between the optical element 11 and the steel ball 14. As a result, the contact state between the optical element 11 and the adjustment screw 18 can be maintained. For this reason, when the adjustment screw 180 is rotationally operated, the optical element 11 can be reliably operated in accordance with the rotation of the adjustment screw 18.

In addition, in the present embodiment, the optical element 11 is pressed against the adjustment screw 18 by the pressing force of the spring member 20. For this reason, the second surface 11b of the optical element 11 is maintained in a state of abutting on the tip portion 18a of the adjustment screw 18. Therefore, the followability of the movement of the optical element 11 when the adjustment screw 180 is rotationally operated can be improved.

In addition, in the present embodiment, the adjustment screw 18 abuts on the second surface 11b of the optical element 11 on the side opposite to the steel ball 14. Specifically, the optical element 11 is received and supported by the steel ball 14, and the adjustment screw 18 is disposed on the side opposite to the steel ball 14. For this reason, as illustrated in FIG. 4 to FIG. 6, the adjustment screw 18 can be disposed to be exposed to the outside of the adjustment mechanism 10. As a result, the adjustment screw 18 can be easily accessed when the adjustment screw 18 is rotated by a tool (for example, the driver) or the like.

In addition, in the present embodiment, the first seat surface member is formed of the steel ball 14. The steel ball 14 is finished with very high dimensional accuracy despite being an inexpensive part. For this reason, by bringing the steel ball 14 into contact with the first surface 11a of the optical element 11 and supporting the optical element 11 by the steel ball 14, the optical element 11 can be positioned with high accuracy. The same applies to the steel ball 44 as the second seat surface member.

In addition, in the present embodiment, one end side in the longitudinal direction C of the optical element 11 is received and supported by the steel ball 14 as the first seat surface member, and the other end side in the longitudinal direction C of the optical element 11 is received and supported by the steel ball 44 as the second seat surface member. Then, both the steel ball 14 and the steel ball 44 abut on the first surface 11a of the optical element 11. As a result, in a case where the first surface 11a of the optical element 11 is the reflection surface (optical surface) of the mirror 318, even if an error occurs in the thickness dimension of the optical element 11, the positions of the steel ball 14 and the reflection surface of the mirror 318 supported by the steel ball 14 do not change. For this reason, it is possible to suppress positional fluctuation of the reflection surface of the mirror 318 due to a dimensional error of the optical element 11.

In addition, in the present embodiment, the steel ball 14 and the spring member 16 are disposed on one end side in the longitudinal direction C of the optical element 11, and the steel ball 44 and the spring member 46 are disposed on the other end side in the longitudinal direction C of the optical element 11. As a result, the optical element 11 is supported at both ends in the longitudinal direction C. For this reason, it is possible to secure a long usable region (effective region) of the optical element 11. In addition, on the other end side in the longitudinal direction C of the optical element 11, the optical element 11 is supported by the steel ball 44 at one point. As a result, the optical element 11 can freely rotate about the center axis J of the optical element 11. For this reason, the posture of the optical element 11 can be easily adjusted.

Second Embodiment

Next, a configuration of an adjustment mechanism according to a second embodiment will be described.

The adjustment mechanism according to the second embodiment is characterized in the direction of the pressing force of the spring member 16 and the direction of the pressing force of the spring member 20 as compared with the above first embodiment.

First, a comparative example for comparison with the adjustment mechanism according to the second embodiment will be described with reference to FIG. 17. The comparative example is applied to the above first embodiment.

Figure 17:
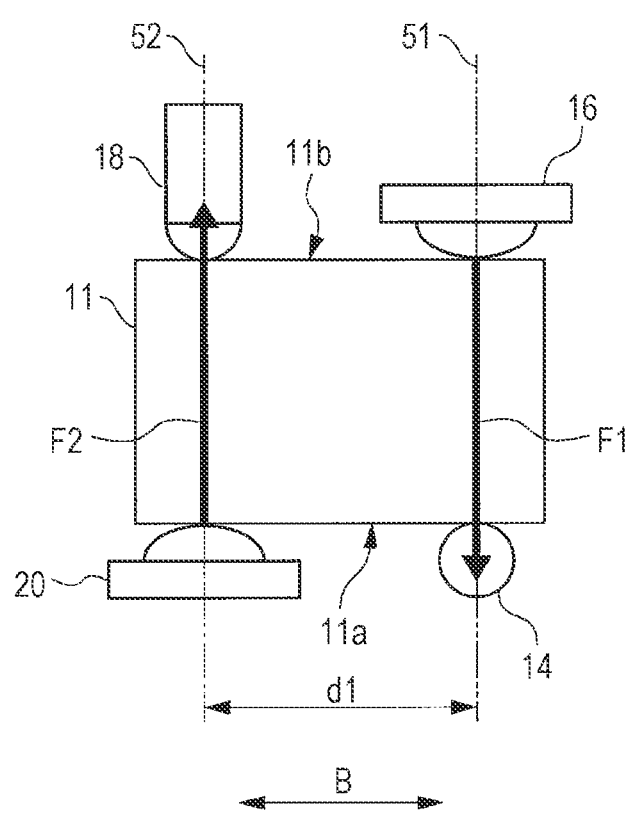
FIG. 17 is a view explaining a comparative example for comparison with the adjustment mechanism according to a second embodiment.

In the comparative example, as illustrated in FIG. 17, a pressing force F1 of the spring member 16 is vertically applied to the second surface 11b of the optical element 11. In addition, a pressing force F2 of the spring member 20 is vertically applied to the first surface 11a of the optical element 11.

Here, a straight line connecting the abutment position of the steel ball 14 on the first surface 11a of the optical element 11 and the abutment position of the spring member 16 on the second surface 11b of the optical element 11 is defined as a first virtual straight line 51. In addition, a straight line connecting the abutment position of the adjustment screw 18 on the second surface 11b of the optical element 11 and the abutment position of the spring member 20 on the first surface 11a of the optical element 11 is defined as a second virtual straight line 52. In addition, in the lateral direction B of the optical element 11, an interval between the first virtual straight line 51 and the second virtual straight line 52 is defined as a first interval d1. In such a case, the direction of the pressing force F1 of the steel ball 14 is a direction along the first virtual straight line 51. In addition, the direction of the pressing force F2 of the spring member 20 is a direction along the second virtual straight line 52. In addition, the interval between the lines of action of the two spring members 16 and 20 is the same as the first interval d1.

Figure 18:
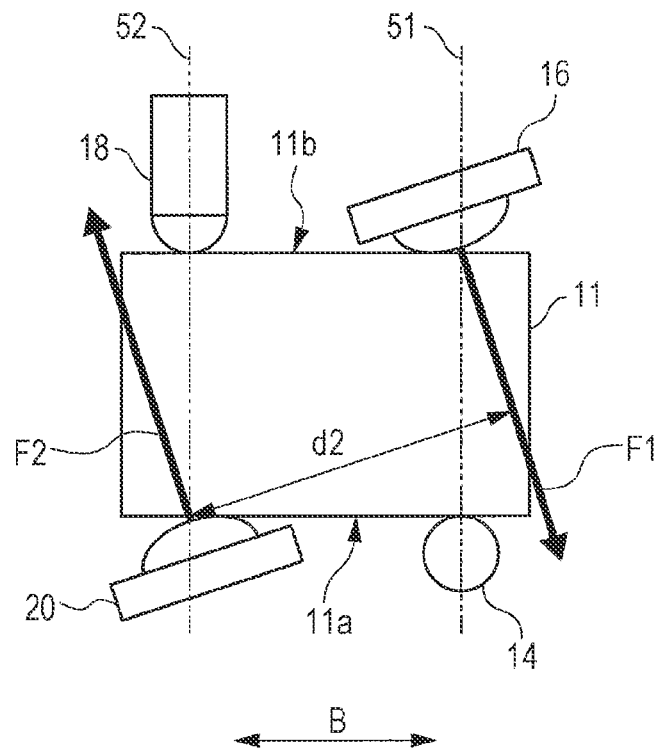
FIG. 18 is a schematic side view illustrating a configuration of the adjustment mechanism according to the second embodiment.

On the other hand, in the second embodiment, as illustrated in FIG. 18, the direction of the pressing force F1 of the spring member 16 is directed to the outside of the optical element 11 with respect to the first virtual straight line 51. In addition, the direction of the pressing force F2 of the spring member 20 is directed to the outside of the optical element 11 with respect to the second virtual straight line 52. The outside of the optical element 11 means the outside of the optical element 11 in the lateral direction B. The direction of the pressing force F1 of the spring member 16 can be changed by the shape design of the spring member 16 or the setting of the attachment angle of the spring member 16. The same applies to the direction of the pressing force F2 of the spring member 20.

As described above, by directing the direction of the pressing force F1 of the spring member 16 and the direction of the pressing force F2 of the spring member 20 to the outside of the optical element 11, the interval between the lines of action of the two spring members 16 and 20 becomes a second interval d2 wider than the above first interval d1. As a result, the moment applied to the optical element 11 by the pressing force F1 of the spring member 16 is larger than that in the comparative example, and the moment applied to the optical element 11 by the pressing force F2 of the spring member 20 is also larger than that in the comparative example. Therefore, in a case where the adjustment screw 18 is rotationally operated, the first surface 11a of the optical element 11 can be prevented from floating from the steel ball 14, and the followability of the movement of the optical element 11 can be enhanced.

Figure 19:
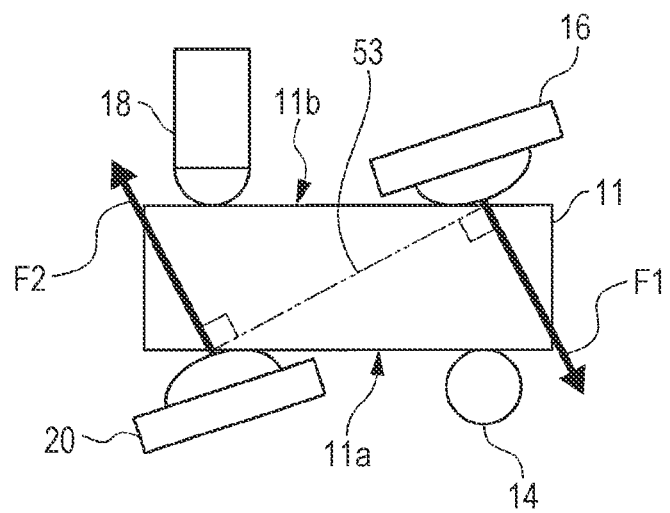
FIG. 19 is a schematic side view illustrating a preferred example of the adjustment mechanism according to the second embodiment.

In addition, as illustrated in FIG. 19, a straight line connecting the abutment position of the spring member 16 on the second surface 11b of the optical element 11 and the abutment position of the spring member 20 on the first surface 11a of the optical element 11 is defined as a third virtual straight line 53. In such a case, the direction of the pressing force F1 of the spring member 16 is a direction perpendicular to the third virtual straight line 53. In addition, the direction of the pressing force F2 of the spring member 20 is a direction perpendicular to the third virtual straight line 53. As a result, the moment applied to the optical element 11 by the pressing force F1 of the spring member 16 is maximized. In addition, the moment applied to the optical element 11 by the pressing force F2 of the spring member 20 is maximized. Therefore, the followability of the movement of the optical element 11 when the adjustment screw 18 is rotationally operated can be further enhanced.

Third Embodiment

Next, a configuration of an adjustment mechanism according to a third embodiment will be described.

Figure 20:
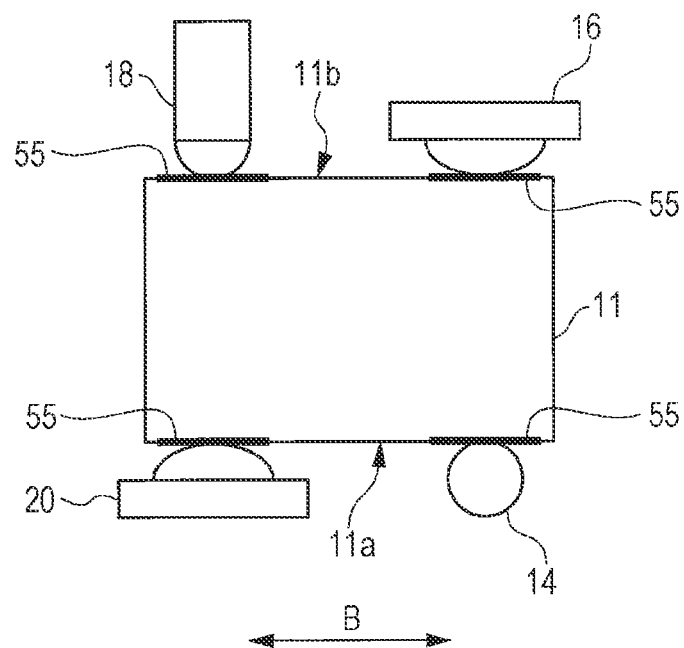
FIG. 20 is a schematic side view illustrating a configuration of an adjustment mechanism according to a third embodiment.

FIG. 20 is a schematic side view illustrating a configuration of an adjustment mechanism according to a third embodiment.

The adjustment mechanism according to the third embodiment is characterized in including a lubricating member 55 as compared with the above first embodiment. The lubricating member 55 is disposed at each of the abutment position between the optical element 11 and the steel ball 44, the abutment position between the optical element 11 and the spring member 16, the abutment position between the optical element 11 and the adjustment screw 18, and the abutment position between the optical element 11 and the spring member 20. As a result, the steel ball 14 abuts on the optical element 11 via the lubricating member 55, and the spring member 16 abuts on the optical element 11 via the lubricating member 55. In addition, the adjustment screw 18 abuts on the optical element 11 via the lubricating member 55, and the spring member 20 abuts on the optical element 11 via the lubricating member 55. The lubricating member 55 is made of, for example, a resin sheet made of polyacetal or an oil film of lubricating oil.

In the third embodiment, when the adjustment screw 18 is rotationally operated, the lubricating member 55 is interposed between the optical element 11 and the steel ball 14, in a manner that the frictional force generated at the abutment portion between the optical element 11 and the steel ball 14 is reduced. The same applies to the abutment portion between the optical element 11 and the spring member 16, the abutment portion between the optical element 11 and the adjustment screw 18, and the abutment portion between the optical element 11 and the spring member 20. As a result, as compared with the configuration not including the lubricating member 55, the followability of the movement of the optical element 11 when the adjustment screw 18 is rotationally operated can be enhanced.

Note that, in FIG. 13, the lubricating member 55 may be disposed at each of the abutment position between the optical element 11 and the steel ball 44 and the abutment position between the optical element 11 and the steel ball 44. In addition, in FIG. 4, the lubricating member 55 may be disposed at each of the abutment position between the optical element 11 and the boss 22a and the abutment position between the optical element 11 and the steel ball 40. In addition, in FIG. 12, the lubricating member 55 may be disposed at each of the abutment position between the optical element 11 and the steel ball 40 and the abutment position between the optical element 11 and the spring member 42. In addition, it is preferable that the lubricating member 55 is disposed on all the members abutting on the optical element 11, but the present invention is not limited to this, and only at least one member abutting on the optical element 11 may be disposed on the target.

Fourth Embodiment

Next, a configuration of an adjustment mechanism according to a fourth embodiment will be described.

Figure 21:
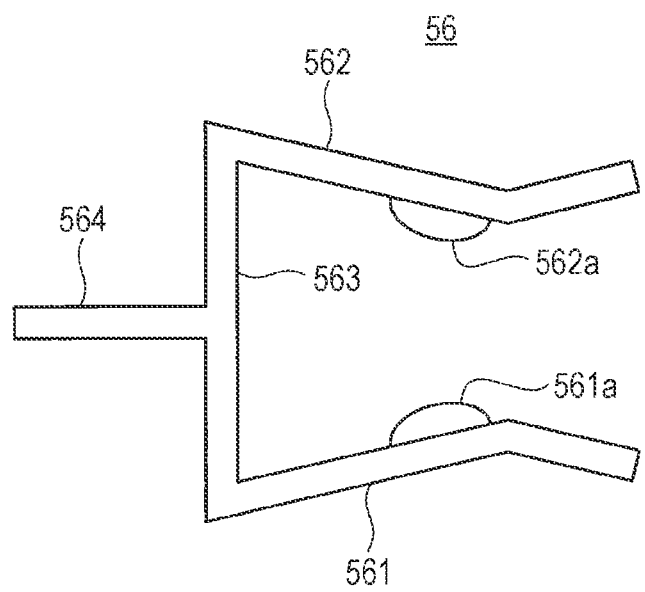
FIG. 21 is a view illustrating a configuration of a spring member included in an adjustment mechanism according to a fourth embodiment.

The adjustment mechanism according to the fourth embodiment is characterized in that the first pressing member and the second pressing member have an integrated structure as compared with the above first embodiment. FIG. 21 illustrates an example of a specific configuration.

FIG. 21 is a view illustrating a configuration of the first pressing member and the second pressing member included in an adjustment mechanism according to a fourth embodiment.

As illustrated in FIG. 21, a spring member 56 integrally includes a first spring portion 561, a second spring portion 562, a coupling portion 563, and a fastening portion 564. The first spring portion 561 corresponds to the first pressing member, and the second spring portion 562 corresponds to the second pressing member. A spherical contact portion 561a is formed in the first spring portion 561, and a spherical contact portion 562a is also formed in the second spring portion 562. The contact portion 561a is a portion that abuts on the first surface 11a of the optical element 11 in point contact, and the contact portion 562a is a portion that abuts on the second surface 11b of the optical element 11 in point contact. The coupling portion 563 is a portion that couples the first spring portion 561 and the second spring portion 562. The fastening portion 564 is a portion fastened to the housing 12 or the bracket 22 with a screw or the like.

With respect to the spring member 56 having the above configuration, the optical element 11 is inserted between the first spring portion 561 and the second spring portion 562. At that time, the first spring portion 561 and the second spring portion 562 are expanded by the optical element 11. As a result, the contact portion 561a of the first spring portion 561 is pressed against the first surface 11a of the optical element 11, and the contact portion 562a of the second spring portion 562 is pressed against the second surface 11b of the optical element 11.

In the fourth embodiment, the first spring portion 561 as the first pressing member and the second spring portion 562 as the second pressing member have an integrated structure. As a result, the number of components of the adjustment mechanism can be reduced as compared with a case where the first pressing member and the second pressing member are configured as separate members.

Fifth Embodiment

Next, a configuration of an adjustment mechanism according to a fifth embodiment will be described.

The adjustment mechanism according to the fifth embodiment is different from the above first embodiment in the configuration of the adjustment member.

Figure 22:
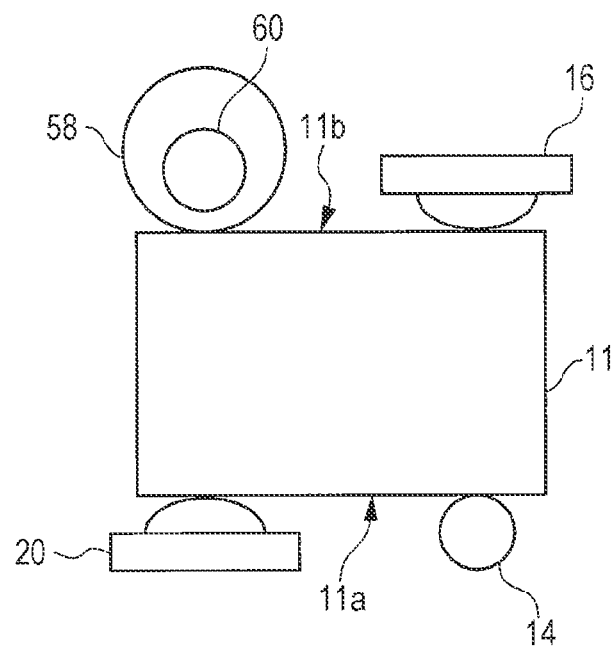
FIG. 22 is a schematic view illustrating a configuration of an adjustment mechanism according to a fifth embodiment.

FIG. 22 is a schematic view illustrating a configuration of an adjustment mechanism according to a fifth embodiment.

As illustrated in FIG. 22, the adjustment mechanism according to the fifth embodiment includes an eccentric pin 58 instead of the adjustment screw 18 described above. The eccentric pin 58 corresponds to an adjustment member that adjusts the posture of the optical element 11. The eccentric pin 58 has a rotation shaft 60 and rotates integrally with the rotation shaft 60. The center of the eccentric pin 58 is radially shifted from the center of the rotation shaft 60. The rotation shaft 60 is rotatably supported by the housing 12 or the bracket 22.

Figure 23:
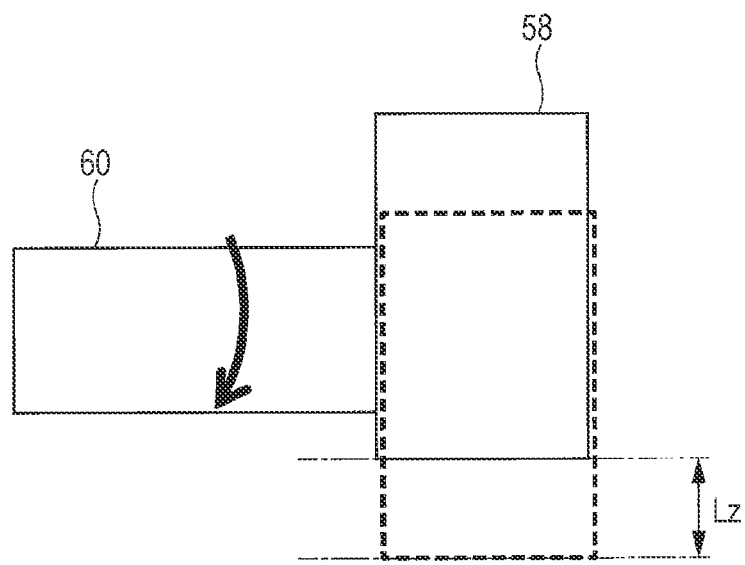
FIG. 23 is a view illustrating displacement of an eccentric pin when a rotation shaft is rotated.

In the adjustment mechanism having the above configuration, the eccentric pin 58 rotates integrally with rotation shaft 60 in a case where the rotation shaft 60 is rotated. In addition, the position of the eccentric pin 58 changes in the radial direction according to the amount of eccentricity of the eccentric pin 58. Assuming that Lz is a displacement amount of the eccentric pin 58 when the rotation shaft 60 is rotated, the displacement amount Lz becomes maximum when the rotation shaft 60 is rotated clockwise or counterclockwise by 180 degrees from the state illustrated in FIG. 22 (see FIG. 23).

On the other hand, the second surface 11b of the optical element 11 is pressed against the outer peripheral surface of the eccentric pin 58 by the pressing force of the spring member 20. Therefore, when the eccentric pin 58 is rotated integrally with the rotation shaft 60, the abutment position between the optical element 11 and the eccentric pin 58 is displaced in the up-down direction of FIG. 22 according to the above displacement amount Lz. Therefore, the posture of the optical element 11 can be adjusted by rotationally operating the rotation shaft 60 of the eccentric pin 58.

Sixth Embodiment

Next, a configuration of an adjustment mechanism according to a sixth embodiment will be described.

In the sixth embodiment, the following configuration is adopted in a manner that, in a case where the temperature of the environment in which the scanning optical device 100 is installed changes, the posture (angle) of the optical element 11 is not shifted due to the temperature change. Note that the temperature of the environment in which the scanning optical device 100 is installed changes according to the internal temperature of the image forming device 1 in which the image forming unit 110 is disposed.

Figure 24:
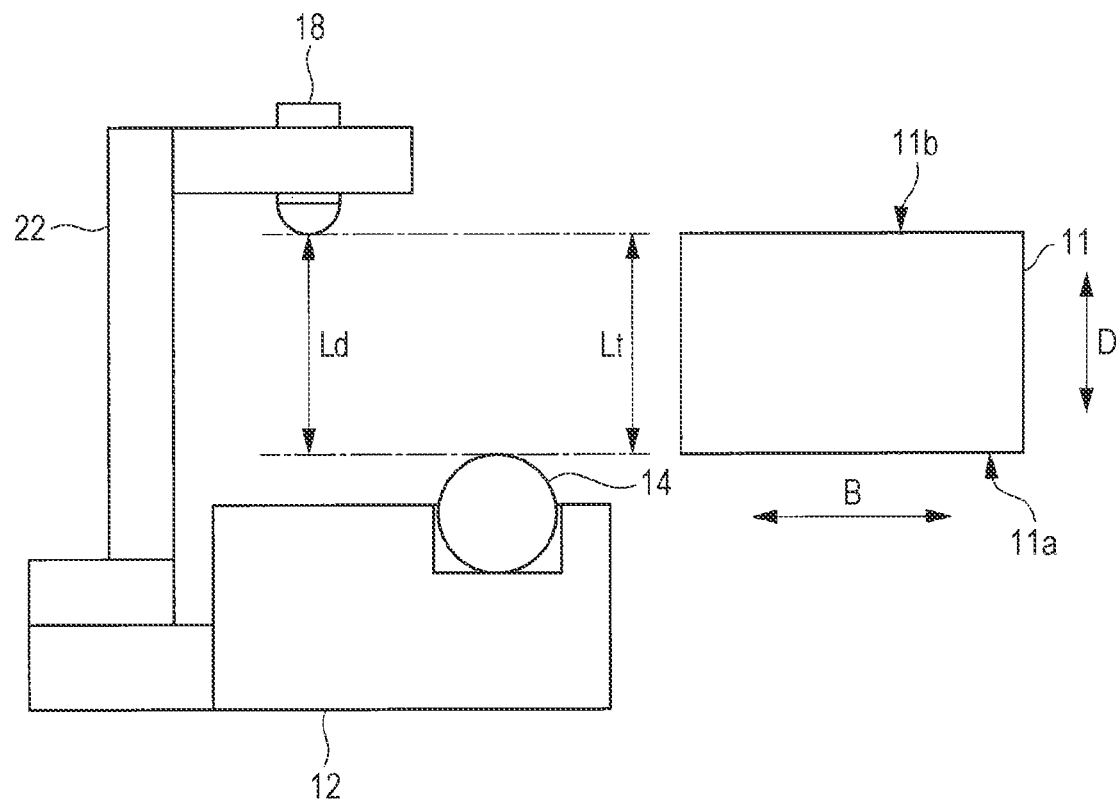
FIG. 24 is a view for explaining a configuration of an adjustment mechanism according to a sixth embodiment.

FIG. 24 is a view for explaining a configuration of an adjustment mechanism according to a sixth embodiment.

In FIG. 24, in a thickness direction D of the optical element 11, the dimension from the first surface 11a to the second surface 11b of the optical element 11 is Lt (mm), and the dimension between the steel ball 14 and the adjustment screw 18 is Ld (mm). In the sixth embodiment, in a case where the optical element 11, the steel ball 14, and the adjustment screw 18 are individually temperature-changed, a thermal expansion amount ΔL1 (mm) of the optical element 11 and a dimensional change ΔL2 (mm) between the steel ball 14 and the adjustment screw 18 satisfy the relationship of ΔL1=ΔL2. The thermal expansion amount ΔL1 of the optical element 11 is a change in the dimension Lt due to the thermal expansion of the optical element 11. The dimensional change ΔL2 between the steel ball 14 and the adjustment screw 18 is a change in the dimension Ld due to thermal expansion of the housing 12, the steel ball 14, the adjustment screw 18, and the bracket 22. For this reason, in order to satisfy the relationship of ΔL1=ΔL2, the dimensions of each part may be set in consideration of the thermal expansion coefficients of the optical element 11, the housing 12, the steel ball 14, the adjustment screw 18, and the bracket 22.

In the adjustment mechanism according to the sixth embodiment, in a case where the environmental temperature of the scanning optical device 100 rises by the driving of the image forming unit 110, the dimension Lt from the first surface 11a to the second surface 11b of the optical element 11 and the dimension Ld from the steel ball 14 to the adjustment screw 18 change by the same amount. For this reason, it is possible to suppress posture fluctuation of the optical element 11 due to a change in environmental temperature.

MODIFICATIONS AND THE LIKE

The technical scope of the present invention is not limited to the above-described embodiment and includes a mode in which various modifications and improvements are added within a range in which specific effects obtained by the constituent elements of the invention and the combination can be derived.

For example, in the above embodiment, the steel ball 14 is brought into contact with the optical element 11 to make the contact state between them point contact, but the present invention is not limited to this, and a spherical portion (not illustrated) may be formed on the first surface 11a of the optical element 11, and a flat portion (not illustrated) of the housing 12 may be brought into contact with the spherical portion to make the contact state between them point contact. The same applies to the contact state between the optical element 11 and the spring member 16, the contact state between the optical element 11 and the adjustment screw 18, the contact state between the optical element 11 and the spring member 20, the contact state between the optical element 11 and the steel ball 44, the contact state between the optical element 11 and the spring member 46, the contact state between the optical element 11 and the boss 22a, the contact state between the optical element 11 and the steel ball 40, and the contact state between the optical element 11 and the spring member 42.

Figure 25A:
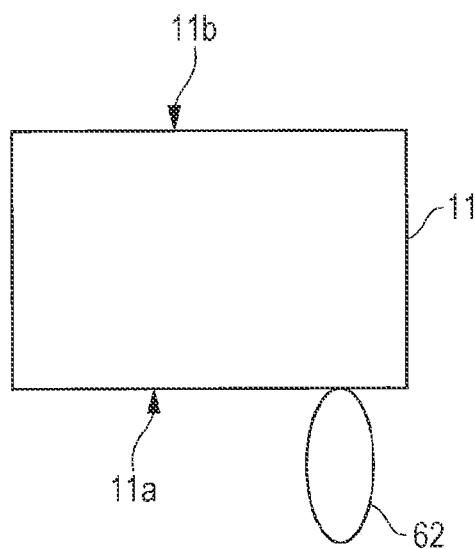
FIG. 25A and FIG. 25B are views illustrating a modification of a seat surface member.
Figure 25B:
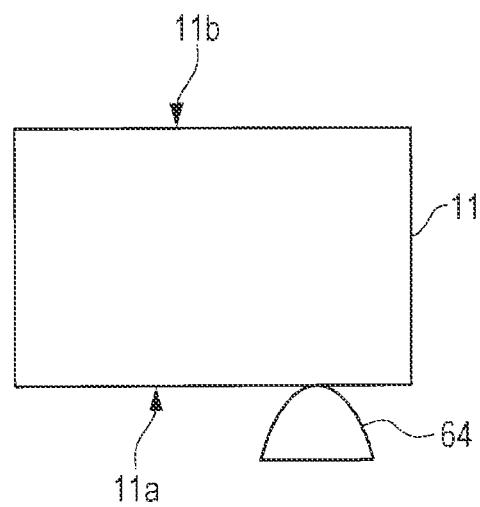

In addition, the seat surface member in point contact with the optical element 11 is not limited to a spherical body such as a steel ball having a spherical shape, and may be, for example, a member 62 having an elliptical surface shape as illustrated in FIG. 25A or a member 64 having a paraboloid shape as illustrated in FIG. 25B. In addition, although not illustrated, the seat surface member may be a member having a shape in which a conical tip portion is rounded.

In addition, in the above embodiment, the first seat surface member is formed of the steel ball 14, but the present invention is not limited thereto, and for example, a portion corresponding to the first seat surface member may be integrally formed with the housing 12. The same applies to the second seat surface member.

In addition, the present invention can be widely applied not only to the scanning optical device but also to an optical device in which the posture of the optical element needs to be adjusted.

Although embodiments of the present invention have been described and illustrated in detail, the disclosed embodiments are made for purposes of illustration and example only and not limitation. The scope of the present invention should be interpreted by terms of the appended claims.

What is claimed is:

1. An optical device comprising:
    an optical element having a first surface and a second surface;
    a first seat surface member that abuts on the first surface of the optical element;
    a first pressing member that abuts on the second surface of the optical element at a position facing the first seat surface member via the optical element, and applies a pressing force to the abutment position to press the optical element against the first seat surface member;
    an adjustment member that abuts on the second surface of the optical element at a position different from the first pressing member, and displaces the abutment position to adjust a posture of the optical element; and
    a second pressing member that abuts on the first surface of the optical element at a position facing the adjustment member via the optical element and applies a pressing force to the abutment position to press the optical element against the adjustment member,
    wherein
    in a case where M1 is a moment acting on the optical element by gravity about the abutment position between the optical element and the first seat surface member, and
    M2 is a moment acting on the optical element by a pressing force of the second pressing member about the abutment position between the optical element and the first seat surface member,
    a relationship of M1<M2 holds.
2. The optical device according to claim 1, wherein
    the optical element is formed in an elongated shape, and
    the abutment position between the optical element and the first seat surface member and the abutment position between the optical element and the adjustment member are disposed to be shifted in a lateral direction of the optical element.

3. The optical device according to claim 2, wherein
the first seat surface member and the adjustment member are disposed on one end side in a longitudinal direction of the optical element, and
a second seat surface member that abuts on the first surface of the optical element and a third pressing member that abuts on the second surface of the optical element at a position facing the second seat surface member via the optical element and applies a pressing force to the abutment position to press the optical element against the second seat surface member are disposed on another end side in the longitudinal direction of the optical element.

4. The optical device according to claim 1, comprising:
a fall prevention part that prevents the optical element from falling off the first seat surface member or the adjustment member by regulating displacement of the optical element in an in-plane direction, wherein
the fall prevention part is disposed in a non-pressed state with the optical element.

5. The optical device according to claim 4, wherein
the fall prevention part has a shape capable of being in point contact with the optical element.

6. The optical device according to claim 5, wherein
a shape capable of being in the point contact is a spherical shape.

7. The optical device according to claim 4, wherein
the fall prevention part is disposed to be able to abut on the optical element via a lubricating member.

8. The optical device according to claim 1, wherein
a direction of a pressing force of the first pressing member is directed to an outside of the optical element with respect to a first virtual straight line connecting the abutment position of the first seat surface member on the first surface of the optical element and the abutment position of the first pressing member on the second surface of the optical element.

9. The optical device according to claim 8, wherein
a direction of the pressing force of the first pressing member is a direction perpendicular to a third virtual straight line connecting the abutment position of the first pressing member on the second surface of the optical element and the abutment position of the second pressing member on the first surface of the optical element.

10. The optical device according to claim 1, wherein
a direction of a pressing force of the second pressing member is directed to an outside of the optical element with respect to a second virtual straight line connecting the abutment position of the adjustment member on the second surface of the optical element and the abutment position of the second pressing member on the first surface of the optical element.

11. The optical device according to claim 10, wherein
a direction of the pressing force of the second pressing member is a direction perpendicular to a third virtual straight line connecting the abutment position of the first pressing member on the second surface of the optical element and the abutment position of the second pressing member on the first surface of the optical element.

12. The optical device according to claim 1, wherein
at least one of the first seat surface member, the first pressing member, the adjustment member, and the second pressing member is in point contact state at an abutment position with the optical element.

13. The optical device according to claim 1, wherein
at least one of the first seat surface member, the first pressing member, the adjustment member, and the second pressing member has a spherical shape at a portion that abuts on the optical element.

14. The optical device according to claim 1, wherein
at least one of the first seat surface member, the first pressing member, the adjustment member, and the second pressing member abuts on the optical element via a lubricating member.

15. The optical device according to claim 1, wherein
in a case where the optical element, the first seat surface member, and the adjustment member are individually changed in temperature,
a thermal expansion amount $\Delta L1$ (mm) of the optical element and a dimensional change $\Delta L2$ (mm) between the first seat surface member and the adjustment member satisfy a relationship of $\Delta L1=\Delta L2$ in a thickness direction of the optical element.

16. The optical device according to claim 1, wherein
the first pressing member and the second pressing member have a same shape and a same dimension.

17. The optical device according to claim 1, wherein
the first pressing member and the second pressing member have an integrated structure.

18. A scanning optical device comprising:
a light source;
an optical deflector that deflects a light ray emitted from the light source; and
the optical device according to claim 1, wherein
the optical element is disposed on a path of a light ray deflected by the optical deflector.

19. An image forming device comprising:
an image carrier for image formation; and
the scanning optical device according to claim 18, wherein
the scanning optical device forms an electrostatic latent image on the image carrier by deflecting a light ray by the optical deflector.

20. An optical device comprising:
an optical element having a first surface and a second surface;
a first seat surface member that abuts on the first surface of the optical element;
a first pressing member that abuts on the second surface of the optical element at a position facing the first seat surface member via the optical element, and applies a pressing force to the abutment position to press the optical element against the first seat surface member;
an adjustment member that abuts on the second surface of the optical element at a position different from the first pressing member, and displaces the abutment position to adjust a posture of the optical element;
a second pressing member that abuts on the first surface of the optical element at a position facing the adjustment member via the optical element and applies a pressing force to the abutment position to press the optical element against the adjustment member; and
a fall prevention part that prevents the optical element from falling off the first seat surface member or the adjustment member by regulating displacement of the optical element in an in-plane direction,
wherein
the fall prevention part is disposed in a non-pressed state with the optical element.

21. An optical device comprising:
an optical element having a first surface and a second surface;
a first seat surface member that abuts on the first surface of the optical element;
a first pressing member that abuts on the second surface of the optical element at a position facing the first seat surface member via the optical element, and applies a pressing force to the abutment position to press the optical element against the first seat surface member;
an adjustment member that abuts on the second surface of the optical element at a position different from the first pressing member, and displaces the abutment position to adjust a posture of the optical element; and
a second pressing member that abuts on the first surface of the optical element at a position facing the adjustment member via the optical element and applies a pressing force to the abutment position to press the optical element against the adjustment member,
wherein
at least one of the first seat surface member, the first pressing member, the adjustment member, and the second pressing member has a spherical shape at a portion that abuts on the optical element.

\* \* \* \* \*